United States Patent [19]
Torii

[11] Patent Number: 5,624,005
[45] Date of Patent: Apr. 29, 1997

[54] RUNNING SPEED CONTROL DEVICE FOR A VEHICLE

[75] Inventor: Yoshinari Torii, Gamagori, Japan

[73] Assignee: Nippondenso Co., Ltd., Kariya, Japan

[21] Appl. No.: 447,773

[22] Filed: May 23, 1995

[30] Foreign Application Priority Data

May 23, 1994 [JP] Japan ................................. 6-108657

[51] Int. Cl.$^6$ ................................................. B60K 31/02
[52] U.S. Cl. ................................................. 180/179
[58] Field of Search ........................... 180/179, 178, 180/177, 176, 171, 170

[56] References Cited

U.S. PATENT DOCUMENTS

| | | | |
|---|---|---|---|
| 5,014,201 | 5/1991 | Tsukahara et al. | 180/170 |
| 5,023,792 | 6/1991 | Shioyama | 180/179 |
| 5,054,570 | 10/1991 | Naito et al. | 180/179 |
| 5,125,471 | 6/1992 | Iwaoka et al. | 180/179 |
| 5,519,259 | 5/1996 | Voigt | 180/179 |
| 5,524,724 | 6/1996 | Nishigaki et al. | 180/177 |

FOREIGN PATENT DOCUMENTS

| | | |
|---|---|---|
| 50-66684 | 6/1975 | Japan. |
| 50-66685 | 6/1975 | Japan. |
| 1-249534 | 10/1989 | Japan. |
| 2-92740 | 4/1990 | Japan. |
| 3-21527 | 1/1991 | Japan. |
| 3-21525 | 1/1991 | Japan ................................. 180/178 |
| 3-82632 | 8/1991 | Japan. |
| 4-91329 | 3/1992 | Japan. |
| 6-40512 | 10/1994 | Japan. |

Primary Examiner—Brian L. Johnson
Assistant Examiner—Frank Vanaman
Attorney, Agent, or Firm—Cushman, Darby & Cushman IP Group of Pillsbury Madison & Sutro LLP

[57] ABSTRACT

When an "off" state of an IDLE switch is detected even once after an ignition switch of an internal combustion engine is turned on, a cruise ECU determines that the IDLE switch is normal, and performs constant-speed cruise control if the start thereof is instructed. Because the constant-speed cruise control is normally instructed while a vehicle is running, if the IDLE switch is normal, the IDLE switch becomes the "off" state at least one time during the time period until the start of the constant-speed cruise control is instructed after the ignition switch is turned on. For this reason, if the IDLE switch does not become the "off" state even once, the cruise ECU determines that the IDLE switch has failed and interrupts the constant-speed cruise control.

32 Claims, 7 Drawing Sheets

RUNNING SPEED CONTROL DEVICE FOR A VEHICLE

BACKGROUND OF THE INVENTION

1. Field of the Invention

The present invention relates to a running speed control device for a vehicle which controls vehicle running speed by driving a throttle mechanism for an internal combustion engine, and to an opening and closing state abnormality detecting device for detecting an abnormality of an opening and closing state detecting device which detects an opening and closing state of the throttle mechanism used by the running speed control device.

2. Related Art

Conventionally, a running speed control device for a vehicle is well-known, which includes a throttle state detecting device such as an IDLE switch for detecting an opening and closing state of a throttle mechanism such as a throttle valve of an internal combustion engine, a vehicle speed detecting device such as a vehicle speed sensor for detecting running speed of a vehicle, and a throttle driving device for driving the throttle valve so that a vehicle speed matches a target running speed responsive to the difference between the vehicle speed and target running speed and an opening and closing states detected by the IDLE switch during the running speed control.

In such a running speed control device for a vehicle, if the running speed control starts when the throttle valve is fully closed and the present vehicle speed is nearly equal to the target running speed, the throttle valve is opened by some degree to prevent temporary drop of the running speed due to the delay, and caused by the time required to move the throttle valve to a desirable opening position.

However, in such a running speed control device for a vehicle, if an IDLE switch fails and can not reliably detect that the throttle valve has opened, the following situation may be caused. For example, if the IDLE switch can not detect that the throttle valve has opened when the throttle valve is opened by some degree as described above, the throttle driving device continues driving the throttle valve toward an open side, because the control device determines that the throttle valve is fully closed. The drive of the throttle valve may go on until the vehicle speed becomes higher than the target vehicle speed. If so, the running speed of the vehicle overshoots and riding comfort of the vehicle deteriorates.

SUMMARY OF THE INVENTION

In view of the above problem of the prior art, it is an object of the present invention to provide a running speed control device for a vehicle which can maintain a riding comfort of a vehicle even if throttle state detecting device such as an IDLE switch should fails.

It is an another object of the present invention to provide an opening and closing state abnormality detecting device for detecting an abnormality of an opening and closing state detecting device which detects an opening and closing state of a throttle mechanism applicable to the running speed control device for a vehicle.

To attain the above objects, in the present invention, when an abnormality detecting device detects an abnormality of a throttle state detecting device by detecting that an opening state of a throttle mechanism has not been detected once between a start of the running speed control and a certain time of the past, prohibiting device prohibits an operation of the throttle driving device. Therefore, it is possible to prevent the throttle driving device from continuing to drive the throttle mechanism toward a faulty open side as a result of the determination that the throttle mechanism is fully closed. For this reason, even if the throttle state detecting device has failed, the riding comfort of the vehicle is maintained and the safety of the running speed control is ensured.

The malfunction of the throttle state detecting device is detected based on the fact that only the fully closed state of the throttle mechanism has been detected until the start of the running speed control is instructed after an ignition switch of an internal combustion engine is turned on. Therefore, it is not required that the device to detect the malfunction of the throttle state detecting device is added independently, and thereby the structure of the running speed control device can be made simple.

Furthermore, it is acceptable that the malfunction of the throttle state detecting device is detected by detecting that a closing state of the throttle mechanism has not been detected once between a start of the running speed control and a certain time of the past. In this case, the malfunction that the throttle state detecting device can not detect the closed state of the throttle mechanism can be detected. Therefore, it is possible to prevent the throttle driving device from not driving the throttle mechanism toward the open side as a result that the throttle state detecting device detects an opening state thereof in spite of the fact that the throttle mechanism is fully closed actually.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form apart of this application. In the drawings:

DETAILED DESCRIPTION OF THE PREFERRED EMBODIMENTS

An embodiment according to the present invention will be described hereinafter with reference to FIGS. 1 to 10.

Figure 1:
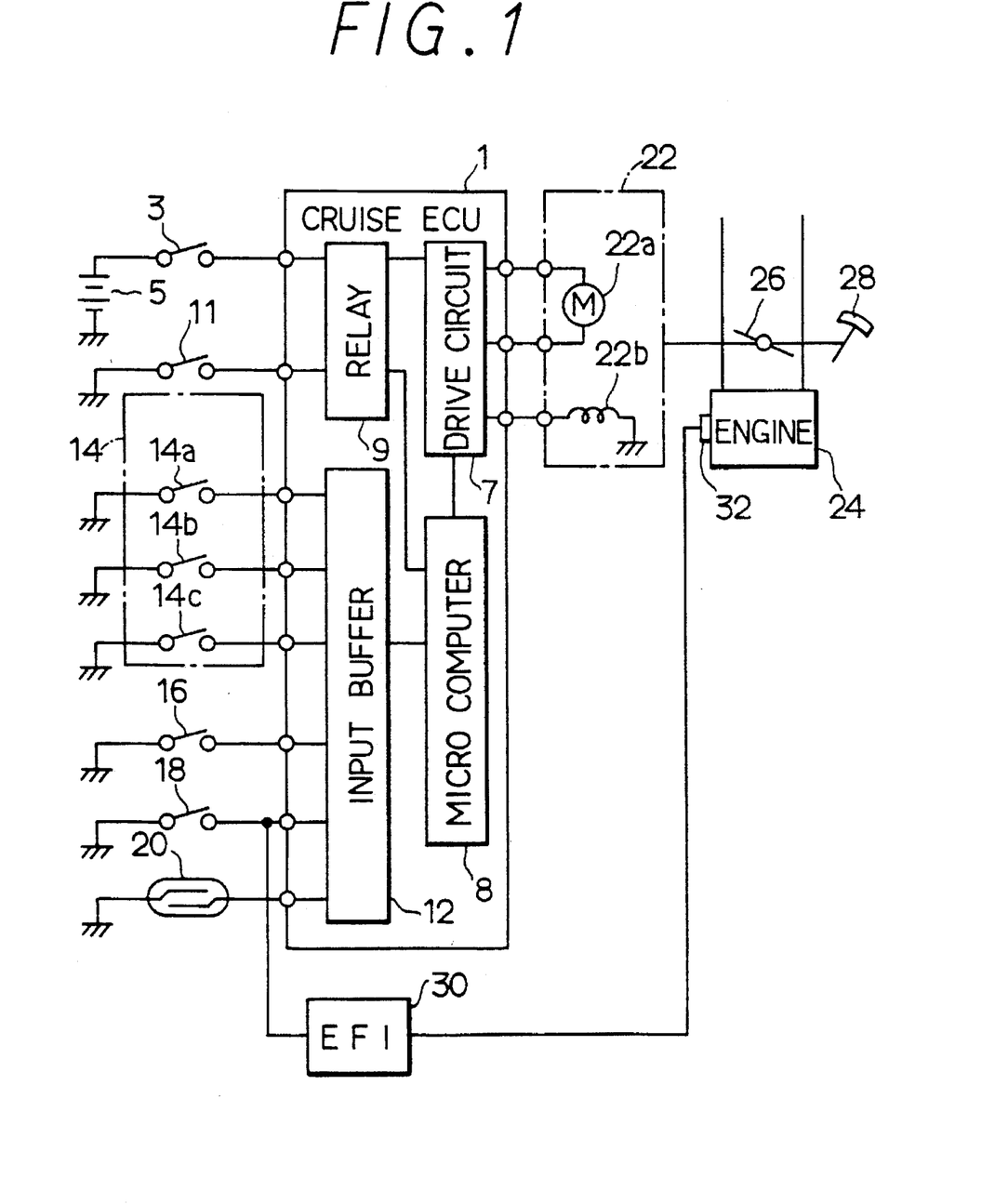
FIG. 1 is an overall structural view of a running speed control device for a vehicle according to an embodiment.

FIG. 1 is an overall structural view of a running speed control device according to the present embodiment. The present running speed control device is installed together with an electronic-control fuel-injection device (EFI) in an automobile having a gasoline engine.

A battery 5 is connected via an ignition switch 3 to a cruise ECU 1 to execute constant-speed cruise control as running speed control. An electrical power is supplied to the cruise ECU 1 by "on" operation of this ignition switch 3, and operation of a microcomputer 8 becomes possible. Additionally, an electrical power is supplied via a main relay 9 to an actuator drive circuit 7 incorporated within the cruise ECU 1. This main relay 9 is connected to a main switch 11 for constant-speed cruise control use, and through "on" operation of this main switch 11, the main relay 9 goes on, an electrical power is supplied to the actuator drive circuit 7, and execution of the constant-speed cruise control becomes possible.

The microcomputer 8 is structured as an ordinary microcomputer provided with ROM, RAM, input/output, bus line, and the like. Signals from various sensors and switches are input to this microcomputer 8 via an input buffer 12. According to the present embodiment, signals are input from control switches 14 for constant-speed cruise control use, a STOP lamp switch 16 which goes on in a case where a driver depresses a brake pedal, an IDLE switch 18 as throttle state detecting means which goes on when a throttle valve 26 (throttle mechanism) is fully closed, and a vehicle speed sensor (vehicle speed detecting means) 20 which generates a signal of a frequency proportionate to the running speed of the vehicle. The foregoing control switches 14 are provided with a SET switch 14a, a RESUME switch 14b, and a CANCEL switch 14c. The SET switch 14a, RESUME switch 14b, and CANCEL switch 14c are switches of a type which goes on only when in a pressed state and goes off immediately when the pressed state is released.

The microcomputer 8 sequentially executes program instructions stored in ROM and, as required, outputs a drive instruction signal to the actuator drive circuit 7.

The actuator drive circuit 7 drives an actuator 22 and, in accordance with the drive instruction signal from the microcomputer 8, outputs actuator drive signal corresponding to the drive instruction signal to a motor 22a and clutch 22b provided within the actuator 22. For example, normal rotation and reverse rotation of the motor 22a as well as rotating speed thereof are controlled by the output signal of the actuator drive circuit 7. Additionally, when the clutch 22b is electrified by the output signal of the actuator drive circuit 7, rotation of the motor 22a is transmitted to the throttle valve 26 of an engine 24. Because of this, the microcomputer 8 can regulate drive power of the engine 24, and as a result thereof, it becomes possible to control running speed of the vehicle. That is, the actuator drive circuit 7, microcomputer 8, and actuator 22 are corresponding to throttle driving means.

Additionally, as a known structure, an accelerator pedal 28 and the throttle valve 26 are interconnected so that the amount of depression of the accelerator pedal 28 is also interlocked with the opening degree of the throttle valve 26. Moreover, depression operation of the accelerator pedal 28 and rotation operation of the motor 22a in a state of interconnection with the throttle valve 26 by the clutch 22b are respectively independently operable, but of both operations, the operation of the one wherein the opening degree of the throttle valve 26 is larger is reflected in rotation of the throttle valve 26. Consequently, when the accelerator pedal 28 has been depressed, the opening degree of the throttle valve 26 comes to correspond to the depression amount of the accelerator pedal 28, even if the motor 22a rotates so that the throttle valve 26 is fully closed. Conversely, when the motor 22a rotates in the direction of opening the throttle valve 26, the opening degree of the throttle valve 26 comes to correspond to the rotation of the motor 22a, even if the accelerator pedal 28 is not depressed. This structure is well known and so a detailed description will be omitted.

An electronic-control fuel-injection device (EFI) 30 is provided in addition to the above-described running speed control device. This electronic-control fuel-injection device 30 calculates a required amount of fuel in accordance with load and the like to the engine 24, and supplies fuel from an injector 32 into an intake air manifold. Furthermore, the electronic-control fuel-injection device 30 also performs fuel cutoff control at a predetermined fuel cutoff condition, herein being a condition whereby the IDLE switch 18 goes on during cruising and the state thereof continues for a predetermined time (for example 500 msec).

Next, constant-speed cruise control processing executed by the foregoing microcomputer 8 will be described with reference to flowcharts and the like shown in FIG. 2 and after.

Figure 2:
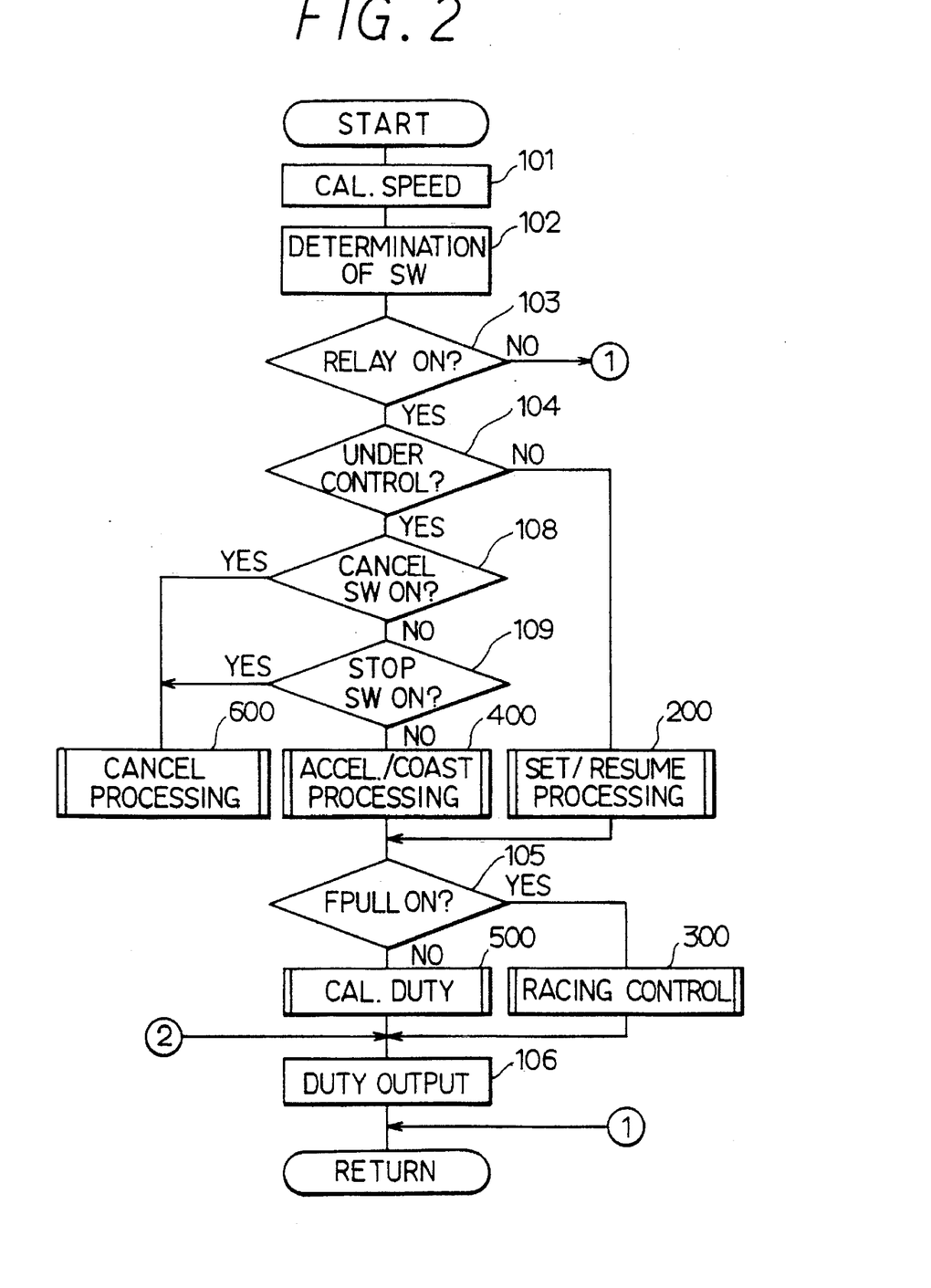
FIG. 2 is a flowchart of constant-speed cruise control processing performed by the running speed control device for a vehicle.

The constant-speed cruise control processing indicated in FIG. 2 is performed at every control cycle T (for example 48 msec) when an electrical power is supplied to the microcomputer 8 of the cruise ECU 1 by "on" operation of the ignition switch 3, and is processing whereby output duty cycle (%) is determined from calculated vehicle speed, switch input, and so on, and the motor 22a of the actuator 22 is electrified for T×duty/100.

Firstly, the cycle of signals from the vehicle speed sensor 20 is read in and the present vehicle speed (vehicle speed: Vn) is calculated (step 101). Next, on/off determination of the respective switch inputs of the control switches 14, STOP lamp switch 16, and IDLE switch 18 is performed (step 102). Next, an "on" state of the main relay 9 is determined (step 103). This is done so as to disable (for starting the constant-speed cruise control) when the main relay 9 has not gone on, because the electrical power is not being supplied to the actuator drive circuit 7. That is, when the main relay 9 has not gone on, processing for duty cycle calculation and so on is not performed and the control cycle ends without any change, and the start of the next control cycle is awaited.

If the main relay 9 has gone on, a decision whether constant-speed cruise control is in progress is made next (step 104). Control mode to be executed is decided on the basis of the input signals from the control switches 14 in this processing and after.

In a case of determination in step 104 that control is not in progress, set/resume processing (step 200) is executed next. This processing is to determine the setting of constant-speed cruise control. Setting, by pressing the SET switch 14a in a state of no constant-speed cruise control, causes the vehicle speed Vn at that time to be read in, causes the vehicle speed Vn to be established to the target vehicle speed Vt and memory vehicle speed Vm, and causes constant-speed cruise control to be performed. Resume processing will be described later.

Figure 3:
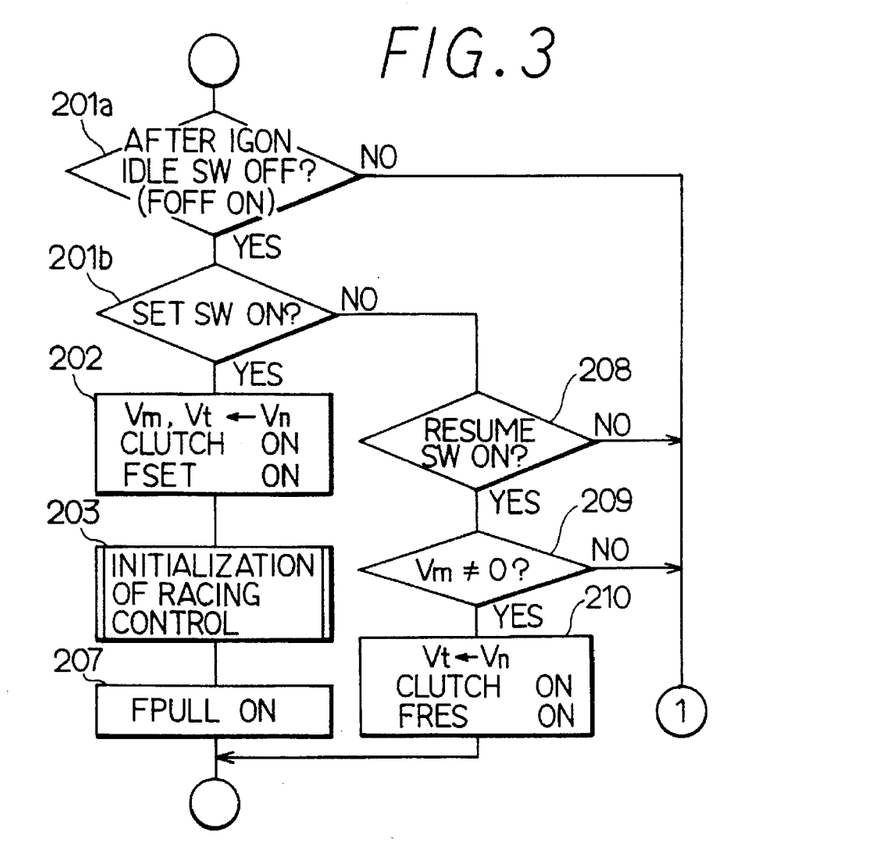
FIG. 3 is a flowchart of set/resume processing therewithin.
Figure 10:
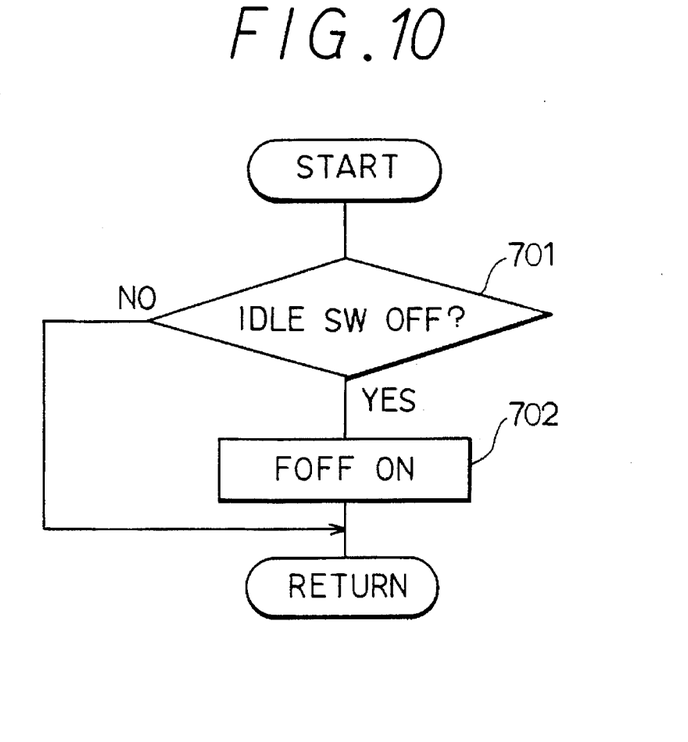
FIG. 10 is a flowchart of OFF state detection processing executed by the running speed control device.

The details of set/resume processing (step 200) are indicated in FIG. 3. Firstly, it is determined whether an "off" state of the IDLE switch 18 has been detected even once after the "on" operation of the ignition switch 3 (step 201a). In the present embodiment, the following processing is performed in an "off" state detection processing which is executed independently from the processing as shown in FIG. 3. This processing is performed at every predetermined cycle after the electrical power is supplied to the microcomputer 8 of the cruise ECU 1 by the "on" operation of the ignition switch 3 and an "off" state detection flag FOFF is made to go off, and as shown in FIG. 10, determines whether the "off" state of the IDLE switch 18 has been detected (step 701). If the "off" state has not been detected, the processing ends with no change, and if detected, the "off" state detection flag FOFF is made to go on (step 702).

When the processing of FIG. 3 is performed thereafter, the "off" state detection flag FOFF is referred to in step 201a. If the "off" state detection flag FOFF is on, an affirmative determination is made to move to the step 201b, and if off, a negative determination is made, the processing ends any change and the start of the next control cycle is awaited.

The constant-speed cruise control is performed while the vehicle is cruising. For this reason, the throttle valve 26 is considered to become open state at least one time as a result of depressing the accelerator pedal 28 until a start of the constant-speed cruise control is instructed (main switch 11 is operated) after the "on" operation of the ignition switch 3 is made. Therefore, in the above-mentioned processing, if the start of the constant-speed cruise control is instructed despite the IDLE switch 18 has not become "off" state once after ignition of the internal combustion engine, the IDLE switch is considered to have failed, or the constant-speed cruise control is considered to have been instructed accidentally, a transfer to the constant-speed cruise control is prevented. That is, the processing of the step 201 corresponds to abnormality detecting means and abnormality determining means.

If the "off" state detection flag FOFF is on and thereby the processing progresses to step 201b and after, an "on" state of the SET switch 14a is determined (step 201b), and if the SET switch 14a is on, the vehicle speed Vn calculated in the immediately previous step 101 is established to be the target vehicle speed Vt and memory vehicle speed Vm (step 202). Furthermore, processing of step 202 makes the clutch 22b go on so that rotation of the motor 22a is linked to the throttle valve 26, and moreover makes a "set" flag FSET go on. Accordingly, moreover, initialization processing of racing control (step 203) to prevent a vehicle speed drop during setting operation is performed.

A vehicle speed drop during setting operation refers to a momentary drop in vehicle speed wherein, immediately after setting operation, the motor 22a of the actuator 22 is at a fully closed position and a delay occurs in rotation from this position to an opening degree of throttle valve 26 at which constant-speed cruising is possible. To prevent this, the motor 22a of the actuator 22 is momentarily driven to the open side immediately after setting operation. The calculation of this amount to drive the motor 22a is performed in setting-time racing initialization processing (step 203).

Figure 5:
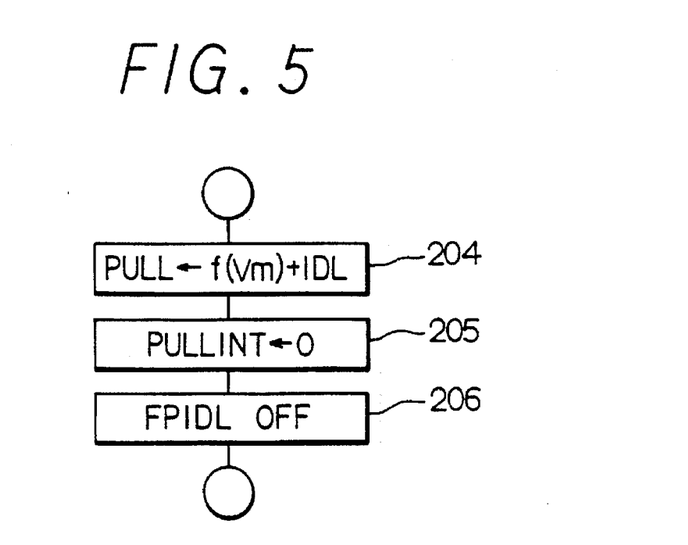
FIG. 5 is a flowchart of setting-time racing initialization processing therewithin.

FIG. 5 indicates a detailed flowchart of setting-time racing initialization processing. Firstly, the quantity PULL to drive the motor 22a to the open side (corresponding to the number of repetitions during constant-speed cruise control), as indicated by the following Equation 1, is calculated as the sum of a quantity f (Vm) determined as a function of the memory vehicle speed Vm, and of a predetermined value IDL (step 204).

$$PULL \leftarrow f(Vm)+IDL \quad \text{(Equation 1)}$$

The predetermined value IDL corresponds to the amount of play in the link system, throttle link system, and so on of the actuator 22.

Next, the quantity PULLINT to be described later is cleared to zero (step 205), furthermore a flag FPIDL to be described later goes off (step 206), and setting-time racing initialization processing (step 203) is ended. Next, a flag FPULL signifying that racing control is in progress goes on (step 207). Consequently, in the next determination of racing control being in progress, i.e., in determination that the flag FPULL is on (step 105), an affirmative determination is made and racing control (step 300) is executed.

Figure 6:
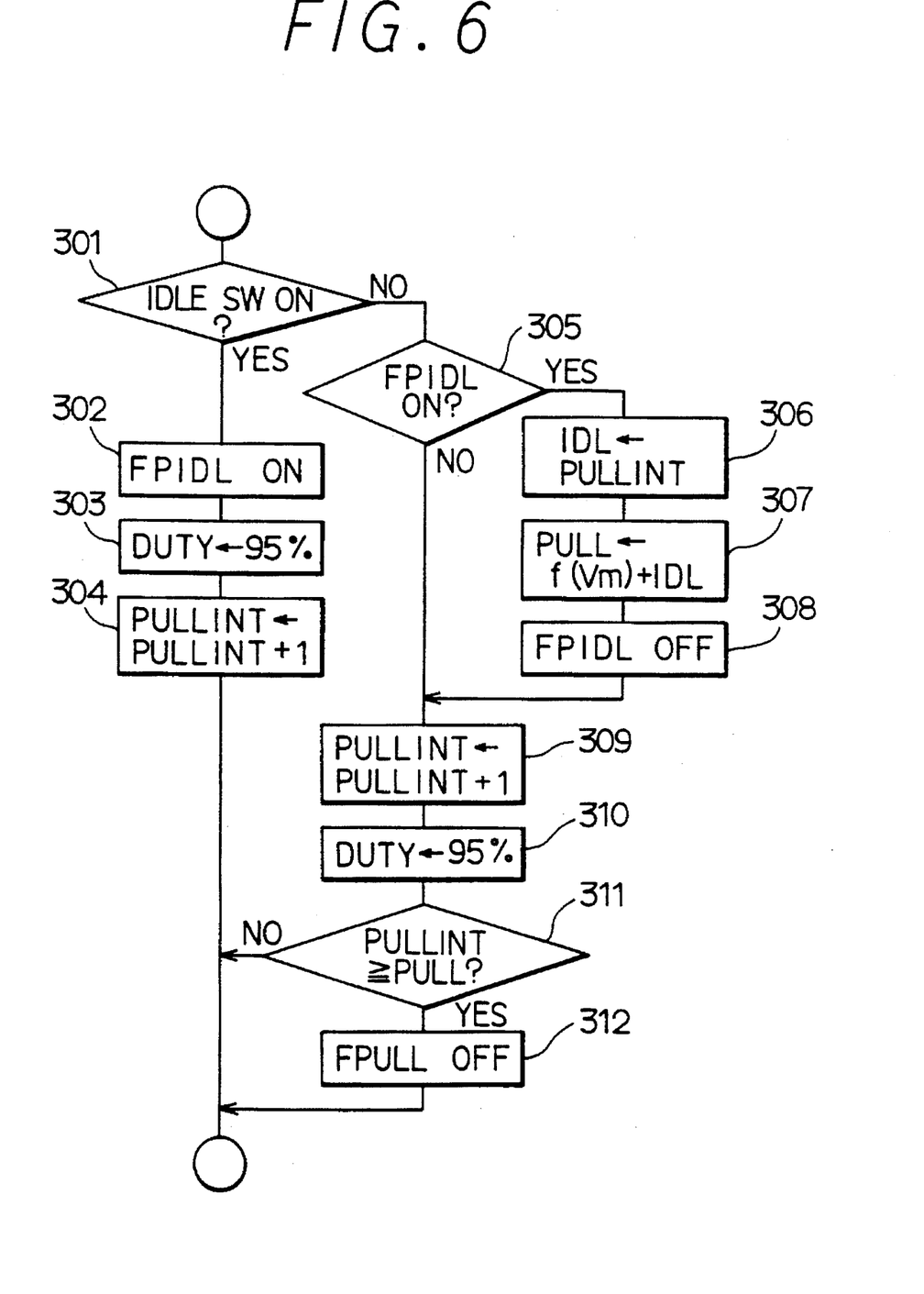
FIG. 6 is a flowchart of racing control processing therewithin.

The details of racing control are indicated in FIG. 6. The IDLE switch 18 going on at the time of initial setting in the processing of step 200 signifies that the present degree of opening of the motor 22a of the actuator 22 is still in a position of play, and that the throttle valve 26 is in a fully closed position.

Consequently, firstly the "on" state of the IDLE switch 18 is determined (step 301), and if on, the flag FPIDL goes on to indicate that an "on" state of the IDLE switch 18 during racing control has been detected (step 302), and subsequently a fixed duty cycle (as high-speed drive use, for example, duty cycle of 95%) is taken to be the output duty cycle so that the actuator is driven at high speed to the open side (step 303). At this time, moreover, the number of times that fixed duty cycle signal has been output is counted by the counter PULLINT (step 304). Consequently, in duty cycle signal output processing (step 106), the motor 22a rotates at high speed by 95% duty cycle and rotation corresponding to play is rapidly caused to be eliminated.

Figure 4:
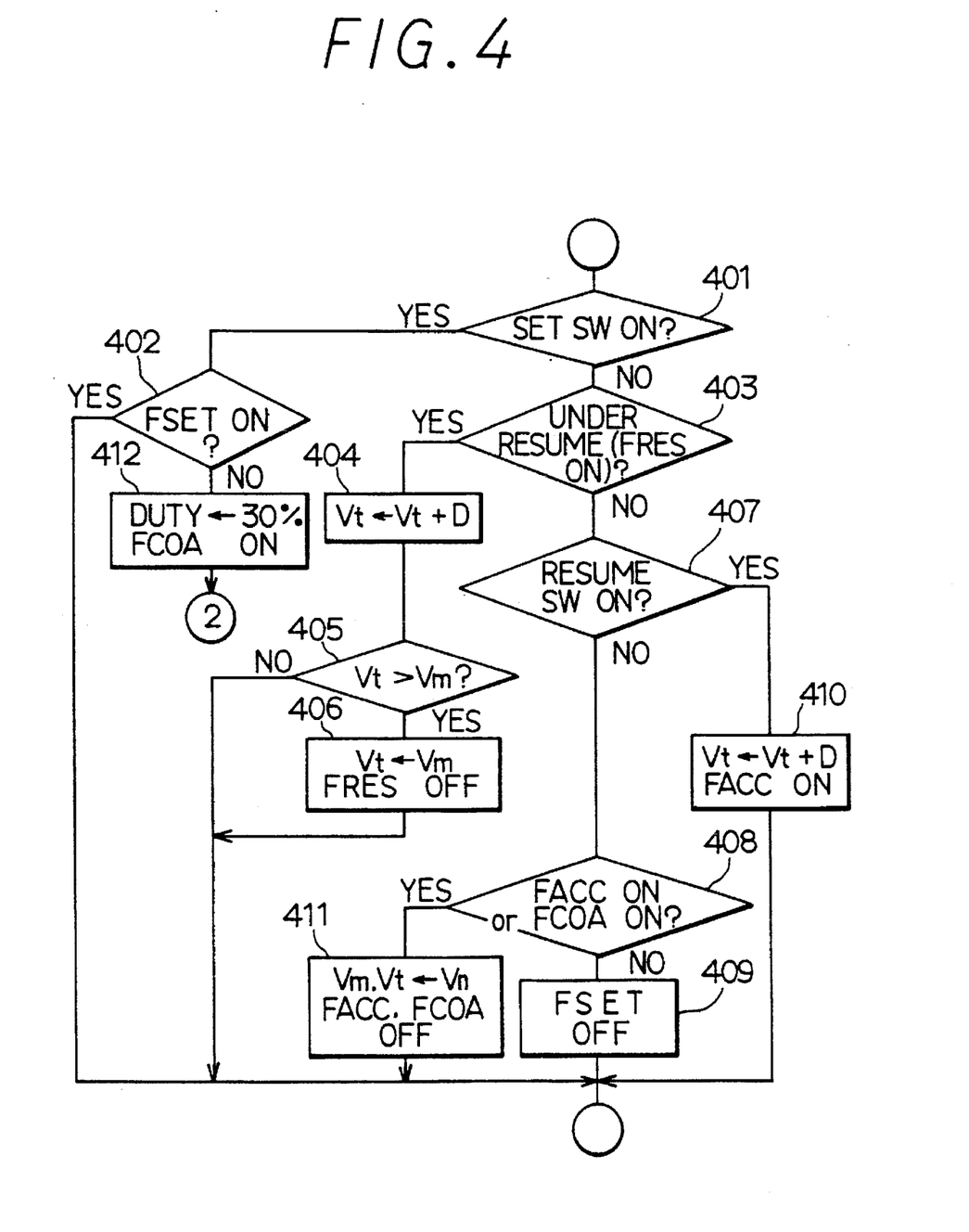
FIG. 4 is a flowchart of accelerate/coast processing therewithin.

In the next control cycle, again, when processing begins from step 101, after passing through steps 102 and 103, constant-speed cruise control is in progress and so affirmative determination is made in step 104, and "on" determination of the CANCEL switch 14c (step 108) and "on" determination of the STOP lamp switch 16 (step 109) are done, but because both switches are off at this time, negative determinations are made, and there is a transition to accelerate/coast processing (step 400).

The details of accelerate/coast processing (step 400) are indicated in FIG. 4. Firstly, "on" determination of the SET switch 14a (step 401) is performed, and even if on at this time, "on" determination of the "set" flag FSET (step 402) is subsequently performed, but because the "set" flag FSET has already been made to go on in step 202 of set/resume processing, an affirmative determination is made, there is an escape from step 400, and the determination of step 105 is made. Because the flag FPULL is still on, the processing of step 300 is executed again. Additionally, in a case where the SET switch 14a was not pressed in step 401, a negative determination is made and subsequently in step 403 determination is made as to whether resume control to be described later is in progress, "on" determination of the RESUME switch is made in step 407, and determination of flags FACC and FCOA is made in step 408, but negative determinations are made in each steps, the flag FSET also goes off (step 409), and next the determination of step 105 is made. Because the flag FPULL is still on, the processing of step 300 is executed again.

In racing control (step 300), as was described above, as long as the IDLE switch 18 is on (step 301), to eliminate play and achieve a substantial degree of opening quickly, duty-establishment processing (step 303) is performed to cause the throttle valve 26 to rotate at high speed in the direction of opening, and the number of repetitions of this processing is counted by the counter PULLINT (step 304).

Thereafter, if the IDLE switch 18 goes off, from step 301 there is subsequently a transition to "on" determination of FPIDL (step 305). In the control cycles up to the previous the flag FPIDL goes on in step 302, and so subsequently the value of the counter PULLINT expressing the number times of fixed-duty cycle signal output up to the present is input to a variable (idle play quantity) IDL expressing play of the throttle valve 26 (step 306). Accordingly, as shown in the following Equation 2, the open-side drive quantity PULL is again calculated on the basis of the memory vehicle speed Vm and the idle play quantity IDL (step 307).

$$PULL \leftarrow f(Vm)+IDL \qquad \text{(Equation 2)}$$

Next, the flag FPIDL goes off (step 308), the counter PULLINT is incremented (step 309), open-side duty cycle is established at 95% (step 310), and determination of PULLINT≧PULL is made (step 311). Because initially PULL is larger than PULLINT by f (Vm)−1, in step 311 a negative determination is made and the throttle valve 26 is controlled to the open side at high speed at 95% duty cycle by the processing of the subsequent step 106. Consequently, as long as PULLINT<PULL (more accurately, until PULLINT=PULL), the throttle valve 26 is rotated to the open side at high speed, and the throttle degree of opening opens rapidly. That is to say, engine output is rapidly caused to rise to achieve the memory vehicle speed Vm established in step 202, and drop in vehicle speed in the period until the actuator 22 achieves a throttle degree of opening which attains the memory vehicle speed Vm is suppressed to the greatest extent possible.

Figure 7:
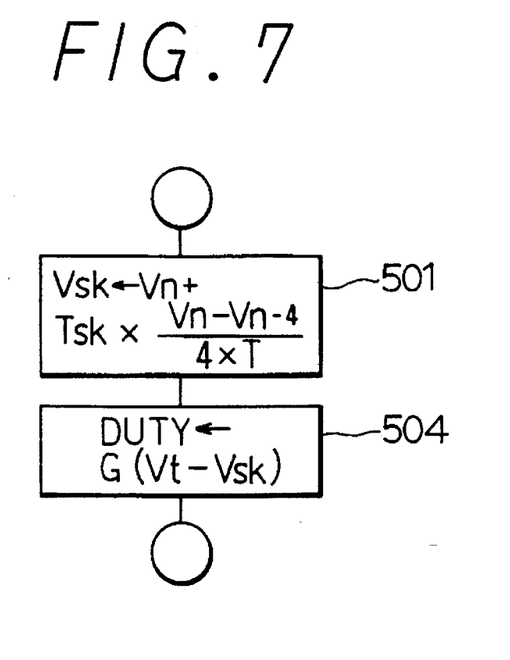
FIG. 7 is a flowchart of duty cycle calculation processing therewithin.

When, by incrementing PULLINT (step 309), PULLINT≧PULL, an affirmative determination is made in step 311 and the flag FPULL goes off (step 312). Because of this, in the subsequent control cycle a negative determination is made in step 105, and duty cycle calculation processing (step 500) is performed.

The details of duty cycle calculation processing (step 500) are indicated in FIG. 7. Firstly, skip speed (Vsk), which is advanced vehicle speed, is calculated as shown in the following Equation 3 (step 501) on the basis of the present vehicle speed Vn, skip time Tsk and a vehicle speed differential value (in actuality, determined by dividing the difference between the vehicle speed Vn and vehicle speed $V_{(n-4)}$ of four control cycles before by the time for four control cycles).

$$Vsk \leftarrow Vn+Tsk \times (Vn-V_{(n-4)})/4T \qquad \text{(Equation 3)}$$

That is to say, Vsk is a value of predicted vehicle speed after skip time Tsk.

Figure 9:
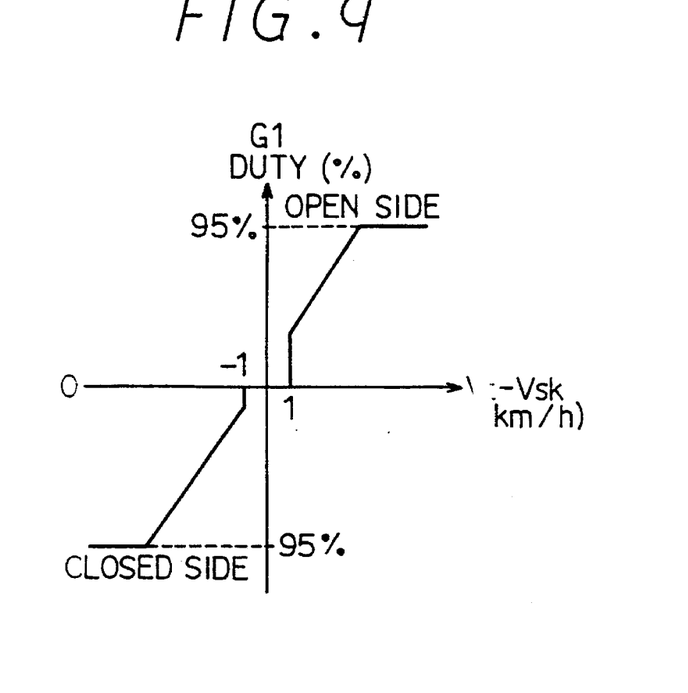
FIG. 9 is a map for calculating duty cycle from difference between vehicle running speed and a target cruise speed.

Next, there is a transition to the processing of step 504, and the duty cycle signal DUTY for driving the motor 22a is calculated from the value (Vt−Vsk: km/h) of subtraction of the skip vehicle speed Vsk from the target vehicle speed Vt in accordance with the map G indicated in FIG. 9. The higher is this duty cycle signal DUTY, the faster becomes the rotational speed of the motor 22a, and the throttle valve 26 is rotated at high speed. This is expressed by an equation as shown in the following Equation 4.

$$DUTY \leftarrow G1 \ (Vt-Vsk) \qquad \text{(Equation 4)}$$

In FIG. 9, the throttle open side is illustrated above the horizontal axis, and the throttle closed side is illustrated below the horizontal axis. The maximum values thereof are, for example, both established at 95% duty cycle. Additionally, an insensitive zone is provided within the range that a difference (Vt−Vsk) is less than 1 and more than −1. In this insensitive zone, the opening degree of the throttle valve 26 is not changed, by making output duty cycle signal to the motor 22a to be 0% DUTY. This is to prevent drive output to the motor 22a from becoming complicated.

By establishing the map G as described above, when Vt−Vsk≧1, output duty cycle to open the throttle valve increases more the larger the difference becomes, with an upper limit of 95%. That is to say, the larger is the difference, the faster grows the throttle degree of opening toward the open side.

Additionally, when Vt−Vsk≦1, output duty cycle to close the throttle valve increases more the smaller the difference becomes, with an upper limit of 95%. That is to say, the smaller is the difference, the faster grows the throttle degree of opening toward the closed side.

Thereafter, as long as the conditions do not change, the processing of steps 101, 102, 103, 104, 108, 109, 401, 403, 407, 408, 409, 105, 501, 504, and 106 is executed repeatedly in every respective control cycle, feedback control is provided so that the vehicle speed Vn becomes the target vehicle speed Vt, and constant-speed cruise control is achieved.

Cancel processing will be described next. The cancel processing (step 600) terminates constant-speed cruise control when the CANCEL switch 14c of the control switches 14 has been pressed during constant-speed cruise control (step 108), or when the STOP lamp switch 16 has been made to go on by depressing the brake (step 109).

Figure 8:
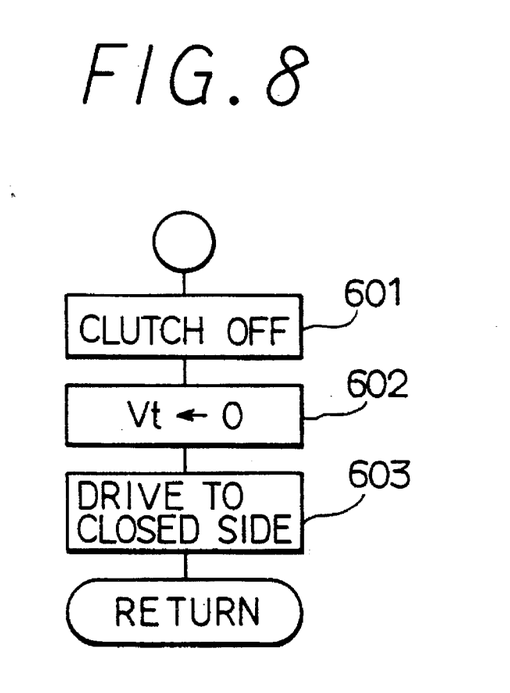
FIG. 8 is a flowchart of cancel processing therewithin.

The details of the cancel processing are indicated in FIG. 8. Firstly, the clutch 22b goes off (step 601), the target vehicle speed Vt is cleared to zero (step 602), the motor 22a is continuously electrified to the closed side (step 603), and the degree of opening of the actuator 22 itself is caused to return to fully closed. At this time, the memory vehicle speed Vm is maintained unchanged without being cleared to zero.

Resume processing will be described next. The resume processing causes vehicle speed to be restored from the present vehicle speed up to memory vehicle speed Vm in a case where the RESUME switch 14b has been pressed in a state where constant-speed cruise control is not in progress and a memory vehicle speed Vm is in memory.

Firstly, determination that control is not in progress is made in step 104, and subsequently the processing of step 200 is executed. If the "off" state of the IDLE switch 18 has been detected (FOFF:ON) after the "on" operation of the ignition switch 3, and the SET switch 14a is off, affirmative determinations are made in steps 201a and 201b, it is determined whether the RESUME switch 14b is on (step 208). If the RESUME switch 14b is on and moreover the memory vehicle speed Vm is not zero, i.e., if a setting for memory vehicle speed Vm has been made (step 209), the present vehicle speed Vn is established to be the target vehicle speed, the clutch 22b goes on, and a flag FRES to indicate that resume is in progress goes on (step 210). Accordingly, the processing of steps 105, 500, and 106 is performed.

In the subsequent control cycle, an affirmative determination is made is step 104, steps 108 and 109 are passed through, step 400 is entered, a negative determination is made in step 401, and it is determined whether resume control is in progress (step 403). That is to say, "on" determination of the flag FRES is performed. An affirmative determination is made in step 403, and the target vehicle 0 speed Vt is increased by a uniform vehicle speed D (step 505). Accordingly, it is determined whether the target vehicle speed Vt is larger than the memory vehicle speed Vm (step 405). If Vt≦Vm, the processing of steps 105, 500, and 106 is subsequently performed. Consequently, as long as Vt≦Vm, the processing of steps 105, 500, and 106 is executed and vehicle speed Vn is caused to rise while causing the target vehicle speed Vt to rise a little at a time.

Accordingly, if the result of rise in target vehicle speed Vt in step 404 is that Vt has become larger than Vm, the memory vehicle speed Vm has been established to be the target vehicle speed Vt and the flag FRES goes off (step 406).

In the subsequent control cycle, a negative determination is made is step 403, and because the RESUME switch 14b has already been released, on determination of the RESUME switch 14b in the subsequent step 407 is determined in the negative, the "on" determination of the flag FACC or the flag FCOA of step 408 is also determined in the negative, the flag FSET goes off (step 409), and subsequently steps 105, 500, and 106 are executed and constant-speed cruise control is obtained.

Acceleration processing will be described next. The acceleration processing performs speed-increase control when the RESUME switch 14b has been pressed during constant-speed cruise control, and shifts to constant-speed cruise control taking, as the target vehicle speed Vt, the vehicle speed Vn at the time when the RESUME switch 14b is thereafter released. Firstly, when it is determined in the determination of step 104 that constant-speed cruise control is in progress, steps 108 and 109 are passed through and step 400 is entered, there is a transition from step 401 to step 403, and it is determined in the determination of step 403 that "resume" control is not in progress, "on" determination of the RESUME switch 14b of step 407 is determined in the affirmative. Because of this, the target vehicle speed Vt is caused to increase by a uniform vehicle speed D, and the flag FACC to indicate that accelerate control is in progress goes on (step 410). In the step 500 thereafter, the target vehicle speed Vt increased by the amount D is employed to calculate the drive duty cycle of the motor 22a and control is performed so that the vehicle speed Vn matches the increased target speed Vt. Because of this, speed-increase control is attained. As long as the RESUME switch 14b continues to be depressed, the target speed Vt rises within a predetermined speed of a legal speed limit or the like as an upper limit, and vehicle speed Vn increases.

When the accelerate control is terminated, if the RESUME switch 14b is released, a negative determination is made in step 407, in step 408 the flag FACC is on and so an affirmative determination is made, the present vehicle speed Vn is established to be the memory vehicle speed Vm and the target vehicle speed Vt, and moreover the flags FACC and FCOA go off (step 411). In this way, there is a shift to constant-speed cruise control.

Coast processing will be described next. The coast processing performs deceleration control when the SET switch 14a has been pressed during constant-speed cruise control, and shifts to constant-speed cruise control taking, as the target vehicle speed Vt, the vehicle speed Vn at the time when the SET switch 14a is thereafter released. Firstly, when it is determined in the determination of step 104 that constant-speed cruise control is in progress, steps 108 and 109 are passed through and step 400 is entered, and in the determination of step 401 it is determined that the SET switch 14a is on. Because the flag FSET has already gone off in step 409, a negative determination is made in step 402, fixed-duty cycle output (for example 30%) is established to drive the motor 22a to the closed side, the flag FCOA to indicate that coast control is in progress goes on (step 412). Accordingly, after the duty output of step 106 there is a transition to the subsequent control cycle. Moreover, the "on" determination of the flag FSET in step 402 is performed to discriminate between the SET switch 14a being on during setting operation and the SET switch 14a being on for coasting.

When the coast control is terminated, the SET switch 14a is released and so there is passage from step 401 through steps 403 and 407 to step 408, and because the flag FCOA is on thereat, the present vehicle speed Vn is subsequently established to be the memory vehicle speed Vm and the target vehicle speed Vt, and moreover the flags FACC and FCOA go off (step 411). In this way, there is a shift to constant-speed cruise control.

Constant-speed cruise control is performed as described above. In particular, when malfunction of the IDLE switch 18 is detected, the performance of the constant-speed cruise control is interrupted. If the constant-speed cruise control is executed while the IDLE switch 18 can not become "off" state due to malfunction thereof, there arises a possibility that the throttle valve 26 continues being driven toward the open side as a result of the determination that the throttle valve 26 is fully closed. According to the present embodiment, however, occurrence of such an undesirable situation can be reliably prevented. For this reason even, if the IDLE switch 18 has failed, the riding comfort of the vehicle is maintained and the safety of the constant-speed cruise control is ensured.

The malfunction of the IDLE switch 18 is detected based on the fact that the "off" state thereof has been detected/until the start of the constant-speed cruise control is instructed by the main switch 11 or the like after the "on" operation of the ignition switch 3 is made. That is, the malfunction of the IDLE switch 18 can be detected by the cruise ECU 1 by itself. Therefore, it is not required that the device to detect the malfunction of the IDLE switch 18 is provided independently, and thereby the structure of the running speed control device can be made simple.

Furthermore, according to the present invention, operating condition of the throttle valve 26 is detected by the IDLE switch 18 alone, without attaching a throttle opening degree sensor such as a potentiometer to the actuator 22. Thus, a number of components in the device can decrease, and the weight of the device and the manufacturing cost thereof can be reduced. Moreover, according to the present embodiment, in the device which detects the operating state by the IDLE switch 18 alone, since the malfunction of the IDLE switch can be certainly detected by the simple structure, the light-weight vehicle can be obtained and the cost thereof can be reduced.

An abnormality detecting device which detects an abnormality responsive to whether the IDLE switch becomes the "off" state after the ignition of the internal combustion engine as described in the foregoing embodiment, is applicable to the device other than the constant-speed cruise control device. For example, according to the foregoing embodiment, the fuel cutoff control is performed if the IDLE switch 18 is on for the predetermined time period while the vehicle is cruising, and the abnormality detecting device may be applied to this fuel cutoff control. In this case, it is possible to prevent the fuel from being cut off undesirably based on the determination where the throttle valve is fully closed as a result that the IDLE switch keeps the "on" state despite the throttle valve 26 has opened.

The malfunction of the IDLE switch 18 can be detected whether the IDLE switch 18 becomes off until the main switch 11 which instructs the start of the constant-speed cruise control is operated, because the start of the constant-speed cruise control is instructed while the vehicle is cruising. Therefore, in the embodiment described above, the malfunction of the IDLE switch 18 can be detected without adding any device. However, in a case where the above abnormality detecting device is applied to the fuel cutoff control or the like, the abnormality detecting device detects whether the IDLE switch 18 becomes off until the vehicle has reached a predetermined running state estimated that the accelerator pedal 28 is depressed, the running state is, for example, the vehicle speed reaching the predetermined speed. As described above, if an appropriate condition is established, the malfunction of the IDLE switch can be detected by a simple structure similar to the present embodiment.

Additionally, according to the present embodiment, the only "off" state of the IDLE switch 18 is detected. However, it is acceptable to detect the trouble with the IDLE switch 18 responsive to whether the IDLE switch 18 changes from the "on" state to the "off" state. In this case, the abnormality where the IDLE switch continues to be held at the "off" state can also be detected. That is, when the ignition switch 3 is operated, the accelerator pedal 28 has not been depressed normally, and the throttle valve is fully closed. Consequently, if the IDLE switch is normal, the IDLE switch changes from the "on" state to the "off" state after the "on" operation of the ignition switch 3. For this reason, if the IDLE switch 18 continues to be held at the "off" state and its output signal does not change, it is detected as an abnormality of the IDLE switch 18. Therefore, if the abnormality detecting device described above is applied to the fuel cutoff control, it can prevent the occurrence of the situation where the IDLE switch 18 is held at the "off" state despite the throttle valve being fully closed for a predetermined period, and the fuel is not cut off erroneously.

Furthermore, according to the present embodiment, when the abnormality detecting device detects the malfunction of the IDLE switch 18, the constant-speed cruise control is interrupted. However, it is acceptable to change the control mode and perform the changed constant-speed cruise control. For example, when the IDLE switch 18 has trouble (step 201a: No), a direct transfer to step 500 is executed, and the constant-speed cruise control can be performed responsive to a vehicle speed without using the signal from the IDLE switch 18. In this case, although controllability will reduce slightly, it is possible to perform the constant-speed cruise control even when the IDLE switch 18 has failed.

Moreover, the malfunction of the IDLE switch 18 can be determined by whether the IDLE switch 18 has been turned on at least one time after "on" operation of the ignition switch 3, or whether both "on" state and "off" state of the IDLE switch 18 have been detected one time or more respectively until the start of the constant-speed cruise control is instructed by the set switch 14a or resume switch 14b, because the throttle valve 26 is fully closed when the ignition switch 3 is turned on. In the former, it is possible to detect the malfunction of where the IDLE switch 18 can not be turned on (so-called "off" malfunction). When this kind of trouble has occurred, if the constant-speed cruise control is performed, the vehicle speed may become smaller than the target cruise speed. This is because the cruise ECU determines that the throttle valve 26 is opened in spite of the fact that the throttle valve 26 is fully closed actually. However, if the cruise ECU interrupts the constant-speed cruise control when the above kind of trouble has occurred, it is possible to prevent the vehicle speed from falling excessively and thereby the riding comfort of the vehicle does not deteriorate. In the latter, it is possible to detect not only the malfunction where the IDLE switch 18 can not be turned on but also the malfunction where the IDLE switch 18 can not be turned off (so-called "on" malfunction).

Furthermore, in the foregoing embodiments, the malfunction of the IDLE switch 18 is determined according to the "on" or "off" state thereof until the vehicle reaches a predetermined running state (for example, an instruction of the start of the constant-speed cruise control) after the "on" operation of the ignition switch 3. However, the detection period to detect the malfunction of the IDLE switch 18 does not limit the above period and can establish in various ways. For example, it is acceptable to detect the malfunction of the IDLE switch 18 according to the "on" or "off" state thereof until the vehicle reaches the predetermined state after the time when the vehicle starts to move from stopping state. When the vehicle is stopping, the throttle valve 26 is fully closed. Thereafter, the throttle valve 26 becomes the open state at least one time until the vehicle reaches the predetermined running state. Consequently, it is possible to detect the "on" malfunction, "off" malfunction, and both the "on" malfunction and "off" malfunction responsive to the "on" or "off" state of the IDLE switch 18 during the above period.

Furthermore, it is acceptable that the beginning of the detection period is the time when depression of a brake pedal of the vehicle is released. Immediately after the depression of the brake pedal is released, the accelerator pedal 28 is not depressed either, and the throttle valve 26 is fully closed. After that, the accelerator pedal 28 is depressed to open the throttle valve 26. That is, the throttle valve 26 becomes the closed state and opened state respectively after the depression of the brake pedal is released. Consequently, it is possible to detect the "on" malfunction, "off" malfunction, and both the "on" malfunction and "off" malfunction responsive to the "on" or "off" state of the IDLE switch 18 during the above period.

Moreover, it is acceptable that the beginning of the detection period is the time when the main switch 11 is turned on. When the start of the constant-speed cruise control is instructed, the throttle valve 26 is opened to keep the vehicle speed at a constant speed. Therefore, it is possible to detect the "on" malfunction responsive to the "on" state of the IDLE switch 18 during the above period. Also, it is acceptable that the beginning of the detection period is the time when the running speed of the vehicle is above a predetermined speed. The throttle valve 26 is opened at least one time when the vehicle speed is above the predetermined speed. Therefore, it is possible to detect the "on" malfunction responsive to the "on" state of the IDLE switch 18 during the above period.

What is claimed is:

1. A running speed control device for a vehicle comprising:

throttle state detecting means for detecting an opening and closing state of a throttle mechanism for an internal combustion engine and generating a first signal when said throttle mechanism is fully closed and a second signal when said throttle mechanism is opened;

vehicle speed detecting means for detecting running speed of a vehicle;

throttle driving means for driving said throttle mechanism so as to cause vehicle speed to match a target running speed based on a difference between said target running speed and vehicle speed detected by said vehicle speed detecting means and said opening and closing state of said throttle mechanism detected by said throttle state detecting means during running speed control;

abnormality detecting means for detecting an abnormality of said throttle state detecting means by detecting that only a closed state of said throttle mechanism has been detected from a time when a predetermined condition is fulfilled until a time when a start of said running speed control is instructed; and prohibiting means for prohibiting an operation of said throttle driving means when said abnormality detecting means detects the abnormality of said throttle state detecting means.

2. A running speed control device for a vehicle according to claim 1, wherein said predetermined condition is selected so that said vehicle reaches a running state in which said throttle mechanism is opened at least one time before said instruction for said running speed control is made after said predetermined condition is fulfilled.

3. A running speed control device for a vehicle according to claim 1, wherein said predetermined condition is that an ignition switch of said internal combustion engine is turned on.

4. A running speed control device for a vehicle according to claim 1, wherein said predetermined condition is that said vehicle starts to move from its stopping state.

5. A running speed control device for a vehicle according to claim 1, wherein said predetermined condition is that a depression of a brake pedal is released.

6. A running speed control device for a vehicle according to claim 1, wherein said predetermined condition is that a main switch is turned on, the main switch activating said throttle driving means so that said throttle driving means can drive said throttle mechanism.

7. A running speed control device for a vehicle according to claim 1, wherein said predetermined condition is that the running speed of said vehicle is above a predetermined speed.

8. A running speed control device for a vehicle according to claim 1, wherein said throttle state detecting means is an IDLE switch.

9. A running speed control device for a vehicle according to claim 1, wherein said throttle state detecting means detects only two states of said throttle mechanism, one state being that said throttle mechanism is fully closed and another state being that said throttle mechanism is at least partially opened.

10. A running speed control device for a vehicle according to claim 1, wherein said prohibiting means prohibits an operation of said throttle driving means by interrupting an operational processing for said running speed control.

11. A running speed control device for a vehicle comprising:
throttle state detecting means for detecting an opening and closing state of a throttle mechanism for an internal combustion engine and generating a first signal when said throttle mechanism is fully closed and a second signal when said throttle mechanism is opened;
vehicle speed detecting means for detecting running speed of a vehicle;
throttle driving means for driving said throttle mechanism so as to cause vehicle speed to match a target running speed based on a difference between said target running speed and vehicle speed detected by said vehicle speed detecting means and said opening and closing state of said throttle mechanism detected by said throttle state detecting means during running speed control;
abnormality detecting means for detecting an abnormality of said throttle state detecting means by detecting that only a closed state of said throttle mechanism has been detected from a time when a predetermined condition is fulfilled until a time when a start of said running speed control is instructed; and
changing means for changing an operation of said throttle driving means when said abnormality detecting means detects the abnormality of said throttle state detecting means.

12. A running speed control device for a vehicle according to claim 11, wherein said throttle state detecting means detects only two states of said throttle mechanism, one state being that said throttle mechanism is fully closed and another state being that said throttle mechanism is at least partially opened.

13. A running speed control device for a vehicle according to claim 11, wherein said changing means changes the operation of said throttle driving means so that said throttle driving means drives said throttle mechanism so as to cause vehicle speed to match said target running speed based on only the difference between said target running speed and vehicle speed detected by said vehicle speed detecting means.

14. A running speed control device for a vehicle according to claim 11, wherein said predetermined condition selected so that said vehicle reaches a running state in which said throttle mechanism is opened at least one time before said instruction for said running speed control is made after said predetermined condition is fulfilled.

15. A running speed control device for a vehicle according to claim 11, wherein said predetermined condition is that an ignition switch of said internal combustion engine is turned on.

16. A running speed control device for a vehicle according to claim 11, wherein said predetermined condition is that said vehicle starts to move from its stopping state.

17. A running speed control device for a vehicle according to claim 11, wherein said predetermined condition is that a depression of a brake pedal is released.

18. A running speed control device for a vehicle according to claim 11, wherein said predetermined condition is that a main switch is turned on, the main switch activating said throttle driving means so that said throttle driving means can drive said throttle mechanism.

19. A running speed control device for a vehicle according to claim 11, wherein said predetermined condition is that the running speed of said vehicle is above a predetermined speed.

20. A running speed control device for a vehicle according to claim 11, wherein said throttle state detecting means is an IDLE switch.

21. A running speed control device for a vehicle comprising:
throttle state detecting means for detecting an opening and closing state of a throttle mechanism for an internal combustion engine;
vehicle speed detecting means for detecting running speed of a vehicle;
throttle driving means for driving said throttle mechanism so as to cause vehicle speed to match a target running speed based on a difference between said target running speed and vehicle speed detected by said vehicle speed detecting means and said opening and closing state of said throttle mechanism detected by said throttle state detecting means during running speed control;
abnormality detecting means for detecting an abnormality of said throttle state detecting means by detecting that only an opening state of said throttle mechanism has been detected from a time when a predetermined condition is fulfilled until a time when a start of said running speed control is instructed; and
prohibiting means for prohibiting an operation of said throttle driving means when said abnormality detecting means detects the abnormality of said throttle state detecting means.

22. A running speed control device for a vehicle comprising:

throttle state detecting means for detecting an opening and closing state of a throttle mechanism for an internal combustion engine;

vehicle speed detecting means for detecting running speed of a vehicle;

throttle driving means for driving said throttle mechanism so as to cause vehicle speed to match a target running speed based on a difference between said target running speed and vehicle speed detected by said vehicle speed detecting means and said opening and closing state of said throttle mechanism detected by said throttle state detecting means during running speed control;

abnormality detecting means for detecting an abnormality of said throttle state detecting means by detecting that only an opening state of said throttle mechanism has been detected from a time when a predetermined condition is fulfilled until a time when a start of said running speed control is instructed; and changing means for changing an operation of said throttle driving means when said abnormality detecting means detects the abnormality of said throttle state detecting means.

23. An opening and closing state abnormality detecting device for a throttle mechanism installed in an internal combustion engine of a vehicle comprising:

throttle state detecting means for detecting an opening and closing state of said throttle mechanism and generating a first signal when said throttle mechanism is fully closed and a second signal when said throttle mechanism is opened;

abnormality detecting means for detecting an abnormality of said throttle state detecting means by detecting that only a closed state of said throttle mechanism has been detected from a time when a predetermined condition is fulfilled until said vehicle reaches a predetermined running state.

24. An opening and closing state abnormality detecting device for a throttle mechanism according to claim 23, wherein said predetermined condition is that the running speed of said vehicle is above a predetermined speed.

25. An opening and closing state abnormality detecting device for a throttle mechanism according to claim 23, wherein said predetermined condition is that a depression of a brake pedal is released.

26. An opening and closing state abnormality detecting device for a throttle mechanism according to claim 23, wherein said throttle state detecting means is an IDLE switch.

27. An opening and closing state abnormality detecting device for a throttle mechanism according to claim 23, wherein said throttle state detecting means detects only two states of said throttle mechanism, one state being that said throttle mechanism is fully closed and another state being that said throttle mechanism is at least partially opened.

28. An opening and closing state abnormality detecting device for a throttle mechanism according to claim 23, wherein said throttle state detecting means detects that said throttle mechanism changes from a fully closed state to an opening state.

29. An opening and closing state abnormality detecting device for a throttle mechanism according to claim 23, wherein said predetermined condition is selected so that said throttle mechanism is opened at least one time from a time when said predetermined condition is fulfilled until said vehicle reaches said predetermined running state.

30. An opening and closing state abnormality detecting device for a throttle mechanism according to claim 23, wherein said predetermined condition is that an ignition switch of said internal combustion engine is turned on.

31. An opening and closing state abnormality detecting device for a throttle mechanism according to claim 23, wherein said predetermined condition is that said vehicle starts to move from its stopping state.

32. An opening and closing state abnormality detecting device for a throttle mechanism installed in an internal combustion engine of a vehicle comprising:

throttle state detecting means for detecting an opening and closing state of said throttle mechanism;

abnormality detecting means for detecting an abnormality of said throttle state detecting means by detecting that only a opening state of said throttle mechanism has been detected from a time when a predetermined condition is fulfilled until said vehicle reaches a predetermined running state.

* * * * *